United States Patent
Werschler et al.

(10) Patent No.: US 11,865,951 B2
(45) Date of Patent: Jan. 9, 2024

(54) LINEAR DRIVE, LONGITUDINAL-ADJUSTMENT UNIT FOR A SEAT, AND MOTOR VEHICLE

(71) Applicant: IMS GEAR SE & CO. KGAA, Donaueschingen (DE)

(72) Inventors: Marco Werschler, Radolfszell (DE); Marcel Mittelbach, Schluchsee (DE)

(73) Assignee: IMS GEAR SE & CO. KGAA, Donaueschingen (DE)

( * ) Notice: Subject to any disclaimer, the term of this patent is extended or adjusted under 35 U.S.C. 154(b) by 52 days.

(21) Appl. No.: 17/616,093

(22) PCT Filed: Jun. 4, 2020

(86) PCT No.: PCT/EP2020/065554
§ 371 (c)(1),
(2) Date: Dec. 2, 2021

(87) PCT Pub. No.: WO2020/245316
PCT Pub. Date: Dec. 10, 2020

(65) Prior Publication Data
US 2022/0316568 A1 Oct. 6, 2022

(30) Foreign Application Priority Data
Jun. 4, 2019 (EP) .................................. 19178264

(51) Int. Cl.
*B60N 2/06* (2006.01)
*F16H 37/12* (2006.01)
(Continued)

(52) U.S. Cl.
CPC ............. *B60N 2/067* (2013.01); *F16H 19/04* (2013.01); *F16H 25/12* (2013.01); *F16H 31/007* (2013.01); *F16H 37/124* (2013.01); *F16H 55/08* (2013.01)

(58) Field of Classification Search
CPC ....... B60N 2/067; F16H 37/124; F16H 55/08; F16H 19/04; F16H 25/12; F16H 31/007
See application file for complete search history.

(56) References Cited

U.S. PATENT DOCUMENTS

| 5,321,590 | A | 6/1994 | Wu | |
|---|---|---|---|---|
| 2022/0234478 | A1* | 7/2022 | Werschler | .............. B60N 2/067 |
| 2022/0325784 | A1* | 10/2022 | Hofschulte | ............. F16H 25/18 |

FOREIGN PATENT DOCUMENTS

| CN | 103781658 A | 5/2014 |
|---|---|---|
| DE | 19932046 A1 | 1/2001 |

(Continued)

OTHER PUBLICATIONS

EP Search Report dated Dec. 3, 2019, in corresponding application EP 19178264.8.

(Continued)

*Primary Examiner* — Terence Boes
(74) *Attorney, Agent, or Firm* — Nath, Goldberg & Meyer; Jerald L. Meyer; Morgan D. Rosenberg

(57) ABSTRACT

The present invention relates to a linear drive (1) having a drive shaft (10) along a longitudinal axis (X), at least two propelling teeth (20), and at least one gear rack (30) comprising a plurality of teeth (31), wherein the propelling teeth (20) are reciprocatingly movable perpendicularly to the longitudinal axis (X) and are drivingly connected to the drive shaft (10) such that said at least two propelling teeth (20) carry out at least one cyclical reciprocating movement (21) during the course of one rotation (φ) of the drive shaft (10), dipping into and out of the at least one gear rack (30) in order to produce propelling motion along the longitudinal axis (X), and wherein the cyclical reciprocating movement (21) of the at least two propelling teeth (20) have phase shifts (Δφ). Furthermore, the present invention relates to a (Continued)

Figure 1:
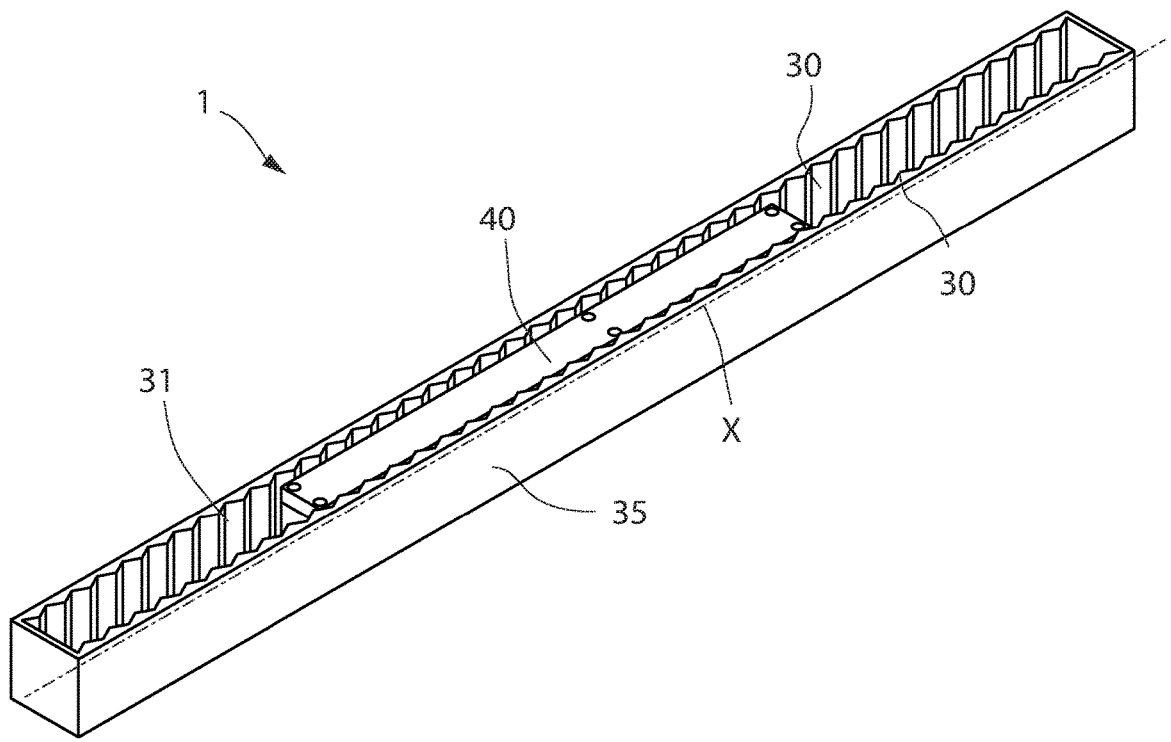

longitudinal-adjustment unit as well as to a motor vehicle coprising such a longitudinal-adjustment unit.

22 Claims, 8 Drawing Sheets

(51) Int. Cl.
  *F16H 31/00* (2006.01)
  *F16H 25/12* (2006.01)
  *F16H 19/04* (2006.01)
  *F16H 55/08* (2006.01)

(56) References Cited

FOREIGN PATENT DOCUMENTS

| | | | |
|---|---|---|---|
| DE | 102011051514 A1 | 1/2013 |
| EP | 0612935 A1 | 8/1994 |
| EP | 2541098 A1 | 1/2013 |
| GB | 2054794 A | 2/1981 |
| JP | 2017087785 A | 5/2017 |
| WO | 2005/032878 A1 | 4/2005 |
| WO | 2008/028540 A1 | 3/2008 |
| WO | 2018108762 A1 | 6/2018 |

OTHER PUBLICATIONS

Corresponding Chinese patent application No. 202080054594.8, office action dated Feb. 18, 2023.

\* cited by examiner a)

b)

_LINEAR DRIVE, LONGITUDINAL-ADJUSTMENT UNIT FOR A SEAT, AND MOTOR VEHICLE_

This is a National Phase Application filed under 35 U.S.C. 371 as a national stage of PCT/EP2020/065554, filed Jun. 4, 2020, an application claiming the benefit of European Application No. 19178264.8 filed Jun. 4, 2019, the content of each of which is hereby incorporated by reference in its entirety.

The present invention relates to a linear drive having the features of claim 1, a longitudinal-adjustment unit for a seat having the features of claim 21 and a motor vehicle having the features of claim 22.

Linear drives are known from the prior art in various embodiments and are widely used as longitudinal-adjustment units for adjusting the position of a seat in motor vehicles. Longitudinal-adjustment units typically work through an interaction of a lower rail fixed to a chassis and an upper rail arranged within the latter rail, wherein the upper rail is motor-driven by the longitudinal-adjustment unit and is coupled to the seat. In the state of the art, the adjustment of the upper rail by the longitudinal-adjustment unit is typically carried out by means of a spindle which is arranged inside the upper rail and is supported at its respective first end and second end.

Such longitudinal-adjustment units are known, for example, from DE 36 40 197 A1, DE 42 08 948 C2, DE 196 42 655 C2, DE 198 15 283 A1, DE 10 2004 013 009 A1 and DE 10 2006 052 936 A1.

Due to the high demands placed on a linear drive, which in addition to providing the adjustment function as a longitudinal-adjustment unit must also ensure accident safety, such linear drives have different designs that require different manufacturing methods and processes. It has been shown that a linear movement without play can only be achieved with great effort and that the breaking loads can only be adjusted with great effort.

This is where the present invention comes in.

The invention is based on the task of proposing an improved linear drive which expediently eliminates the disadvantages known from the prior art. Furthermore, a linear drive with a particularly compact design is to be specified, which enables a linear movement with virtually no play with simultaneous variable and adjustable breaking load. In addition, it should be possible to achieve a fast adjustment speed with the linear drive according to the invention.

These tasks are solved by a linear drive having the features of claim 1, a longitudinal-adjustment unit having the features of claim 21, and a motor vehicle having the features of claim 22.

Further advantageous embodiments of the invention are given in the subclaims.

The linear drive according to the invention with the features of patent claim 1 has a drive shaft which is rotatably arranged along a longitudinal axis. In addition, the linear drive comprises at least two propelling teeth and at least one gear rack with a plurality of teeth, wherein the at least two propelling teeth are reciprocatingly movable perpendicularly to the longitudinal axis and are drivingly connected to the drive shaft such that said at least two propelling teeth can carry out at least one cyclical reciprocating movement during the course of one rotation of the drive shaft and dip into and out of the gear rack in order to produce propelling motion along the longitudinal axis, or, in other words, they can respectively dip into and out of an interdental space between two teeth of the gear rack. It is provided according to the invention, that the cyclical reciprocating movement of the at least two propelling teeth is carried out with a phase shift, wherein here and in the following, a phase shift is understood to mean a dipping in and out of the at least two propelling teeth into the gear rack at different angles of rotation to the drive shaft.

Furthermore, here and in the following, a cyclical reciprocating movement is understood to be a movement sequence of the respective propelling tooth, in which from a starting point the propelling tooth dips once into the gear rack and once completely out of the gear rack and returns to the starting point, and vice versa. The respective propelling tooth can run through one or more complete periods or cycles during one rotation of the drive shaft, wherein the number of periods or cycles always corresponds to a whole number.

When the respective propelling tooth dips into the gear rack, the teeth and the propelling teeth come into operative contact, resulting in propelling motion in the longitudinal axis. For this purpose, the respective propelling tooth dips into the gear rack or alternatively into the interdental space between two teeth, wherein the propelling tooth and the tooth of the gear rack come into operative contact at so-called friction surfaces, from which the propelling motion results. For this purpose, it is necessary that at least the teeth and/or the propelling teeth have friction surfaces, which are designed in the manner of a wedge surface.

According to an advantageous embodiment of the present invention, the at least two propelling teeth are arranged at a first distance along the longitudinal axis and the teeth of the gear rack are arranged at a second distance along the longitudinal axis, wherein the first distance is smaller than the second distance or the second distance is smaller than the first distance. In other words, the first spacing between the propelling teeth and the second spacing between the teeth of the at least one gear rack must be unequal.

The first distance and the second distance are each respectively given in reference to the geometric center of the respective propelling tooth and the tooth of the gear rack, and are measured parallel to the longitudinal axis. By the different measure of the first distance and the second distance, during a cyclical movement of the at least two propelling teeth with a phase shift, it results that the respective propelling teeth are positioned in different relative positions to the teeth of the gear rack.

It has further been shown to be advantageous if the respective propelling tooth and/or the tooth of the gear rack are/is rectangular, triangular, involute or sinusoidal in shape. A triangular or sinusoidal tooth shape is preferred. It is further preferred that the gear rack teeth and/or the propelling teeth are equidistantly arranged parallel to the longitudinal axis. In the case that more than two propelling teeth are provided, it is also preferred if these propelling teeth are arranged parallel to the longitudinal axis in at least one row at an equidistant distance.

It has also been shown to be advantageous if the respective propelling tooth and/or the teeth of the gear rack are symmetrically formed. By a symmetrical design of the respective propelling tooth and/or the tooth of the gear rack, the same adjustment speeds in both propelling motion directions along the longitudinal axis can be achieved under the condition of a constant rotational speed of the drive shaft.

According to a further preferred embodiment of the present invention, the respective propelling tooth has a greater, an equal or a smaller tooth length and/or a greater tooth height than the respective tooth of the gear rack. By increasing the tooth height and the tooth length of the teeth of the gear rack, the bearing surface of the propelling teeth on the tooth profiles or alternatively the friction surface on the tooth profiles is increased, whereby a more uniform power transmission between the gear rack and the propelling teeth can be accomplished. It is also possible that the tooth height and the tooth length of the propelling teeth is greater than the tooth height and the tooth length of the teeth of the gear rack, whereby a higher overlap can be generated and higher maximum loads can be achieved and the running smoothness of the drive device can be improved. Consequently, by selecting the size ratios between the propelling teeth and the teeth of the gear rack, maximum loads and different running characteristics can be set. In the event that the tooth length and the tooth height of the propelling teeth are smaller than the tooth length and the tooth height of the teeth of the gear rack, more than one propelling tooth can dip into or alternatively out of an interdental space between two teeth of the gear rack at the same time.

Furthermore, it has proven to be advantageous if the at least two propelling teeth and the teeth of the gear rack have a corresponding tooth shape. A corresponding tooth shape means that the respective propelling tooth can lie flat against at least one of the friction surfaces of the teeth of the gear rack with its friction surface facing the teeth of the gear rack when it is fully dipped into the interdental space between two teeth of the gear rack. In particular, it has been found to be advantageous if both the respective propelling tooth and the at least one tooth of the gear rack have the same tooth profile angle. In this context, it is noted that the friction surface of the respective tooth profiles does not necessarily need to correspond to a plane, but can likewise be formed as a—preferably outwardly—curved surface.

According to an advantageous embodiment of the linear drive according to the invention, it can be provided that the phase shift of the cyclical reciprocating movement of the at least two propelling teeth with respect to one rotation $\varphi$ of the drive shaft is at least $\frac{1}{256}\varphi$, further preferably at least $\frac{1}{128}\varphi$, $\frac{1}{64}\varphi$, $\frac{1}{32}\varphi$, $\frac{1}{16}\varphi$ or $\frac{1}{8}\varphi$ and preferably less than or equal to $\frac{1}{2}\varphi$. Preferably, the phase shift is less than $\frac{1}{2}\varphi$, especially $\frac{1}{2}\varphi$ or $\frac{1}{4}\varphi$. Preferably, the following may apply to the phase shift: 360°/(number of propelling teeth)<phase shift<360°−(360°/(number of propelling teeth).

It may be advantageous if the mathematical reciprocal value of the respective fraction (1/n) of the phase shift specifies the minimum number k of propelling teeth to be provided, namely k=(n/i)−1, wherein a number i is the number of cyclical reciprocating movements of a propelling tooth at one rotation $\varphi$ of the drive shaft. For example, the provision of at least 2 propelling teeth is preferred if the phase shift between the propelling teeth is $\frac{1}{3}\varphi$ and the propelling tooth carries out one complete reciprocating movement per rotation.

In addition, it has proven to be advantageous if the drive shaft is designed as a crankshaft or camshaft and has at least one guide means that specifies the cyclical reciprocating movement during rotation of the drive shaft. Furthermore, it is preferred if at least two guide means are provided which are arranged spaced apart from one another in the longitudinal axis, wherein each of the at least two guide means is assigned to at least one propelling tooth.

According to a further advantageous embodiment of the present invention, the at least two guide means are arranged rotated at an angle about the longitudinal axis, wherein the angle specifies the phase shift between the cyclical reciprocating movements of the at least two propelling teeth.

According to a further advantageous embodiment of the present invention, the guide means have a contact surface, wherein the contact surface in the longitudinal axis can have a planar, concave, convex, sinusoidal or zigzag course. It is particularly preferred if the contact surface of the guide means has a positive form-fit with the respective propelling tooth or its corresponding contact surface, whereby axial forces can be transmitted from the respective propelling tooth to the drive shaft.

The at least one guide means may comprise a camshaft cam, wherein further preferably the camshaft cam is formed in cross-section as an eccentric, an ellipse, a polygon, a tetragon, a pentagon, a hexagon or a combination of these shapes. Consequently, the camshaft cam may have one or more radius maximums about the circumference. An eccentric typically has one maximum, whereby the propelling tooth, which is operatively connected to the camshaft cam, carries out one complete cyclical reciprocating movement during one rotation of the drive shaft. A number i of the maximums indicates on the one hand the number of complete cyclical reciprocating movements during the course of one rotation of the drive shaft and on the other hand the number i can be used to determine the minimum number n of propelling teeth to be provided.

Furthermore, it has proven to be advantageous if the respective propelling tooth is pressed against the drive shaft in a spring-loaded manner and/or is drivingly connected to the drive shaft by means of a connecting rod.

According to a further advantageous configuration of the present invention, the respective propelling tooth may be drivingly connected to the drive shaft via a sliding contact or a single or multiple rolling contact. It is also preferred if the respective propelling tooth is coupled to the drive shaft by means of a single rolling contact, a double rolling contact or a quadruple rolling contact. The contact surface of the propelling tooth or the contact surface of the drive shaft can roll on at least one contact roller of the respective rolling contact, whereby friction losses as well as wear on the respective contact surface can be reduced.

According to a further embodiment of the present invention, the at least two propelling teeth may be arranged in a row along an axis which is parallel to the longitudinal axis.

In particular, it is preferred if at least two rows of propelling teeth are arranged about the longitudinal axis, wherein at least one gear rack can be associated with the respective row which the respective propelling teeth can dip into and out to generate propelling motion.

According to a further development of the present invention, the at least two gear racks can be arranged about an offset relative to one another. The offset describes a distance, measured in the direction of the longitudinal axis, between the tooth tips of the at least two gear racks. In case the offset is zero, the at least two gear racks are arranged mirror-symmetrically or line-symmetrically with respect to the longitudinal axis, whereas in case of an offset greater than zero, the at least two gear racks are arranged asymmetrically with respect to the longitudinal axis. In a preferred embodiment, the offset can be half a distance, a quarter, or a third of the distance between two teeth of the respective gear racks, whereby preferably the distance between two teeth of the at least two gear racks should be chosen to be equal.

According to a further advantageous embodiment of the present linear drive according to the invention, a sliding carriage is provided in which the at least two propelling teeth and the drive shaft are arranged in a mounted manner. Preferably, the at least two propelling teeth are held transversely to the longitudinal axis in the manner of a sliding bearing, whereby the propelling motion generated by the at least two propelling teeth can be transmitted to the sliding carriage.

The sliding carriage can be made in one or more parts and have means by which it is held linearly movable relative to the at least one gear rack.

A further development of the linear drive provides for a propulsion unit being provided. Preferably, the propulsion unit is an electric motor by which the drive shaft can be driven.

Furthermore, it is advantageous if a gearbox is arranged between the propulsion unit and the drive shaft, wherein particularly preferably a planetary gearbox can be arranged between the propulsion unit and the drive shaft.

The propulsion unit and/or the gearbox may or may not be arranged in the sliding carriage according to one embodiment of the linear drive. Power and/or control signals may be supplied to the propulsion unit in the sliding carriage by means of a drag chain with corresponding electrical cables.

Furthermore, the present invention relates to a longitudinal-adjustment unit comprising a linear drive according to the invention.

Another aspect of the present invention relates to a motor vehicle having at least one such linear drive according to the invention.

Figure 2:
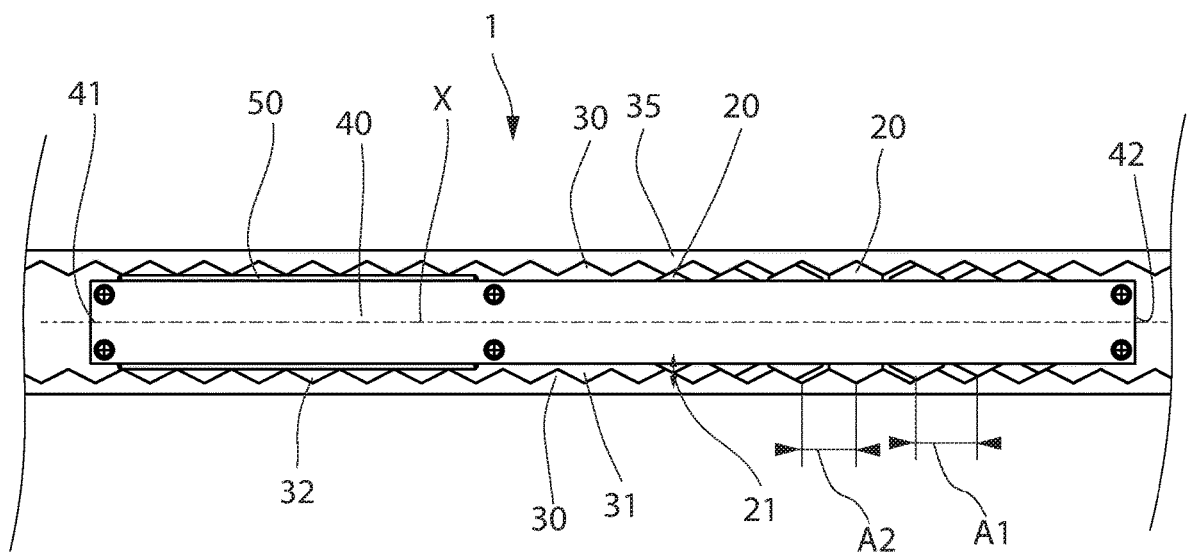
Figure 3:
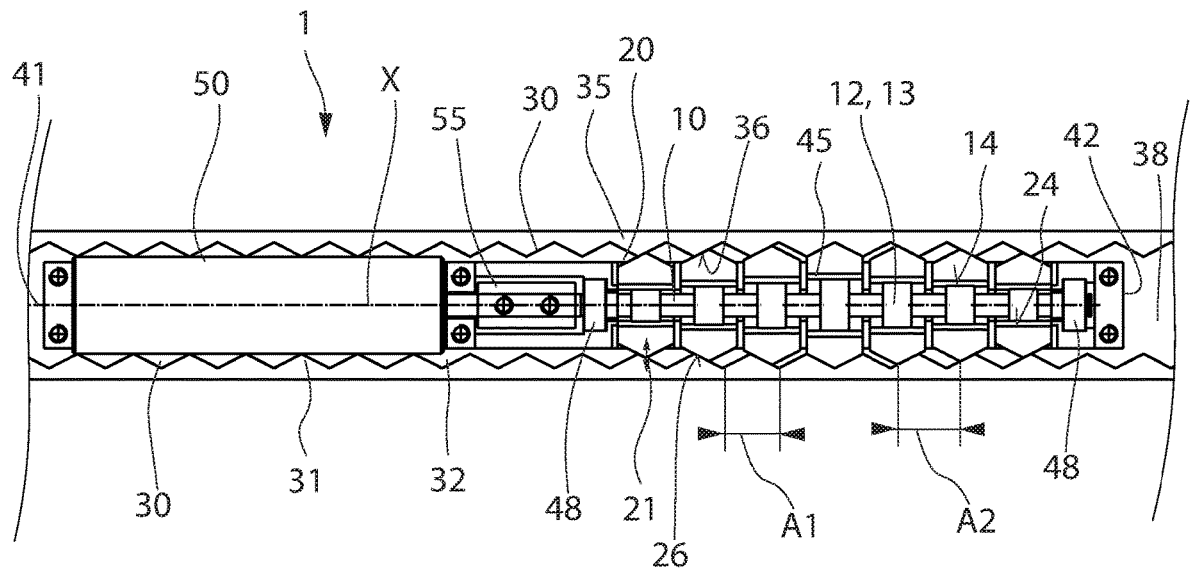
Figure 4:
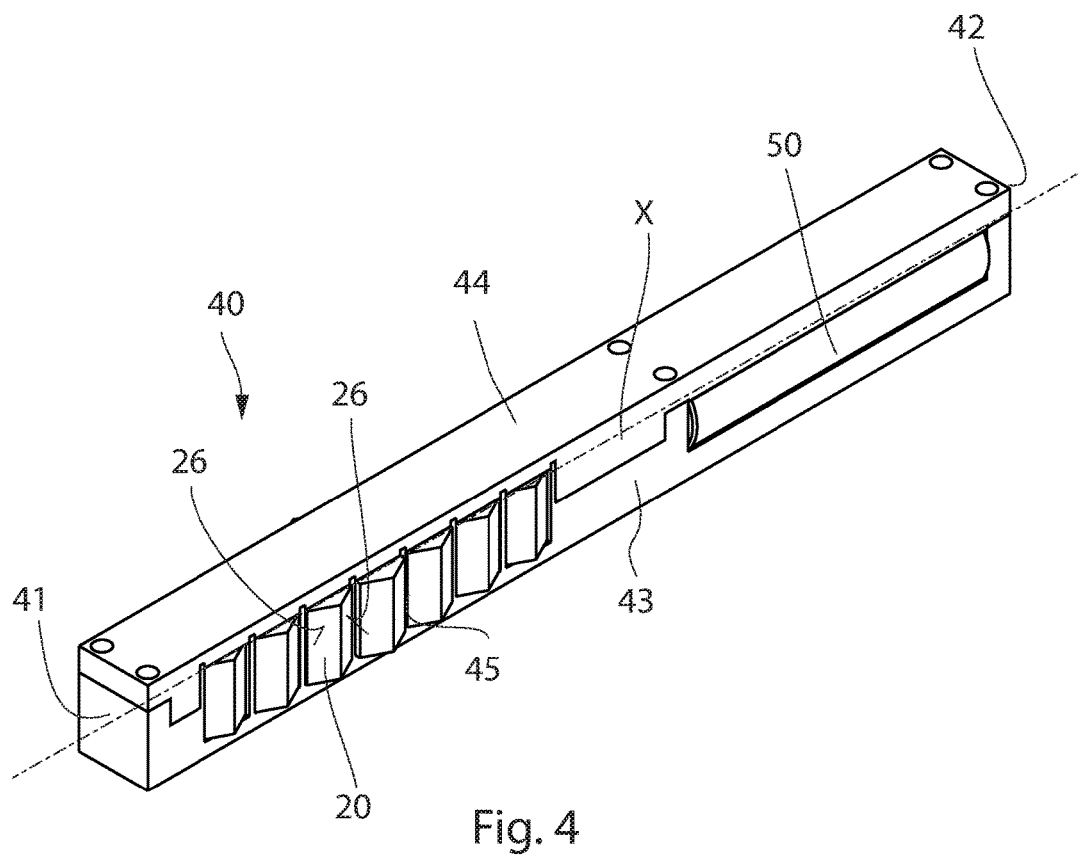
Figure 5:
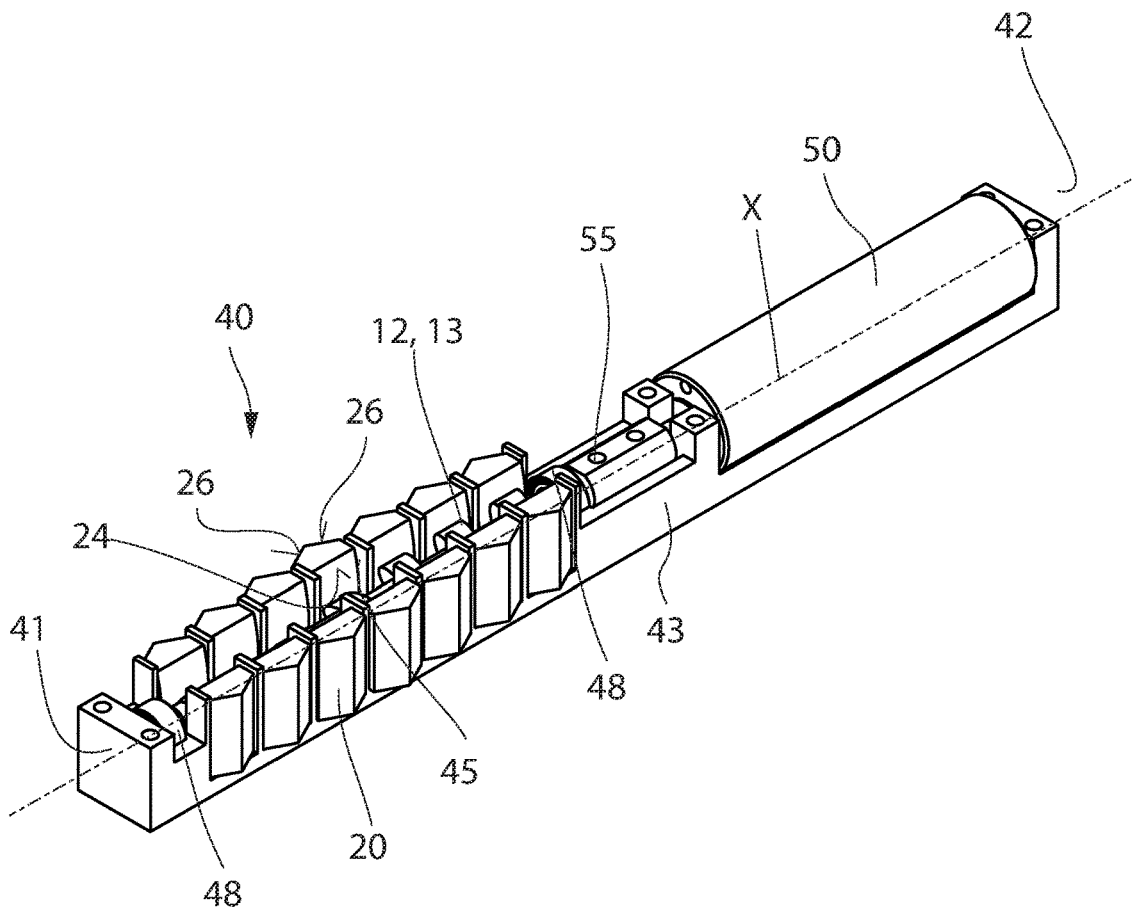
Figure 6:
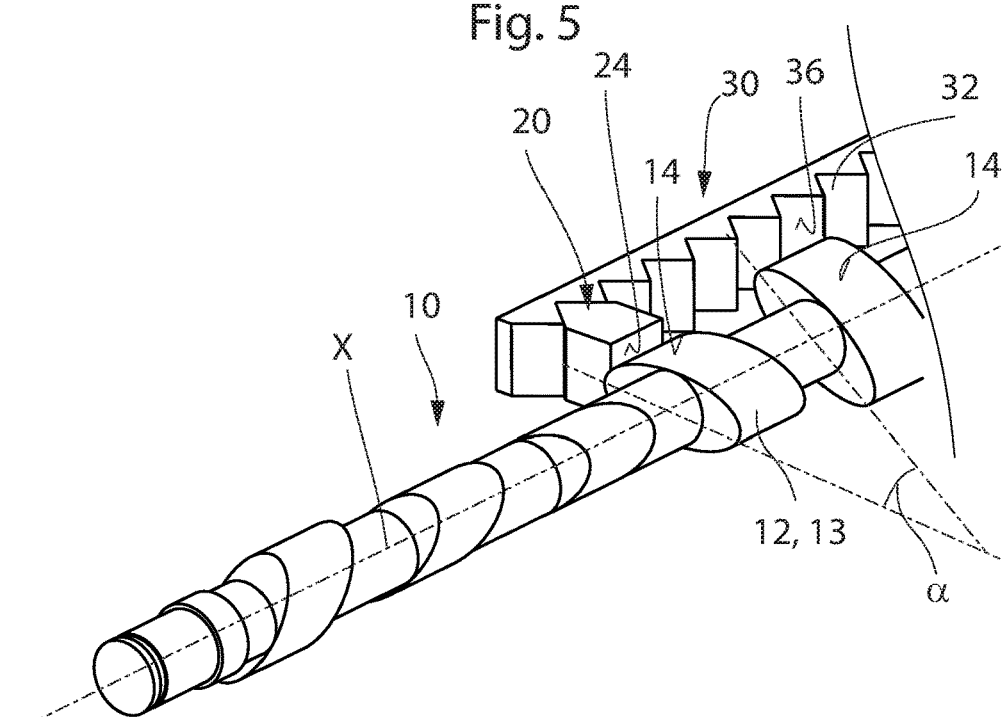
Figure 7:
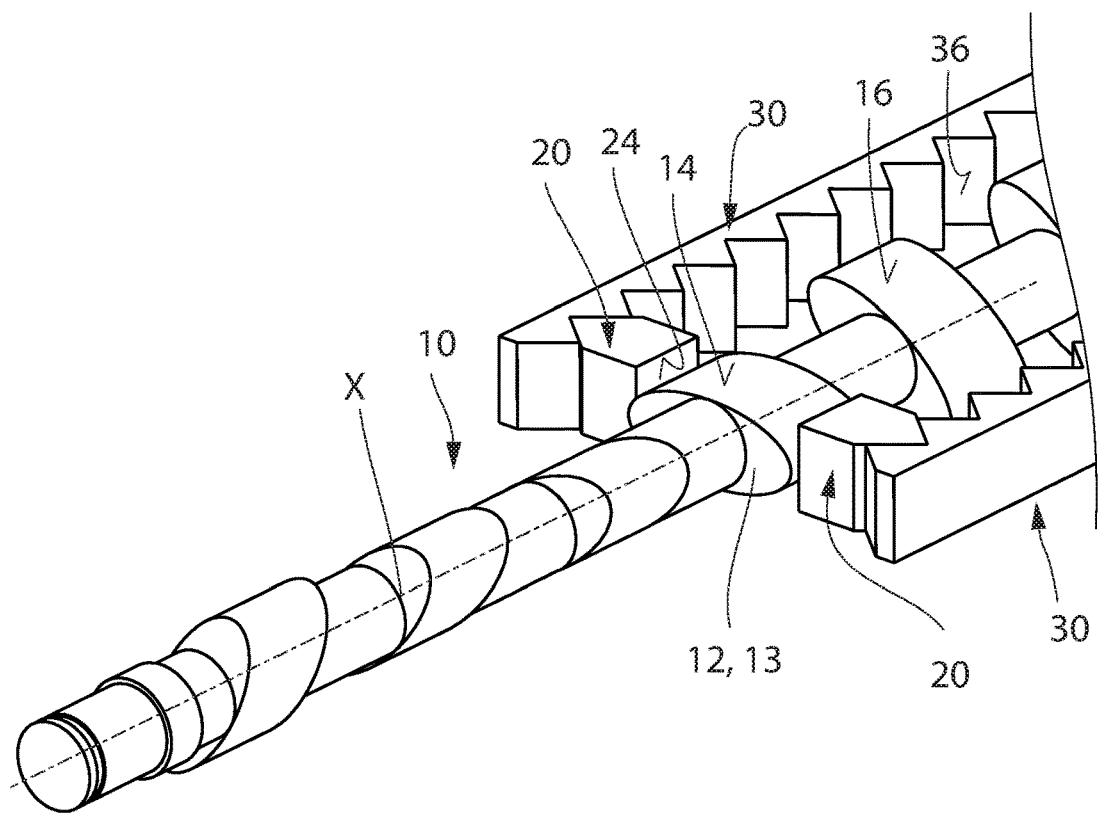
Figure 8:
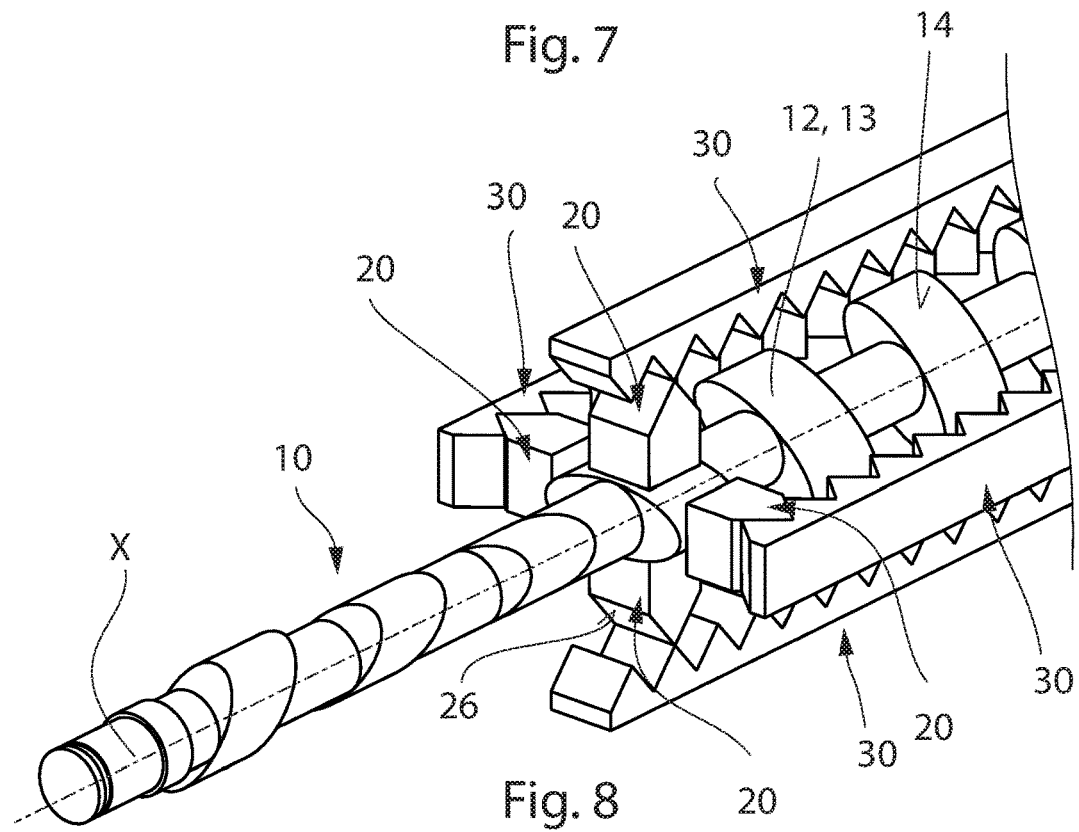
Figure 9:
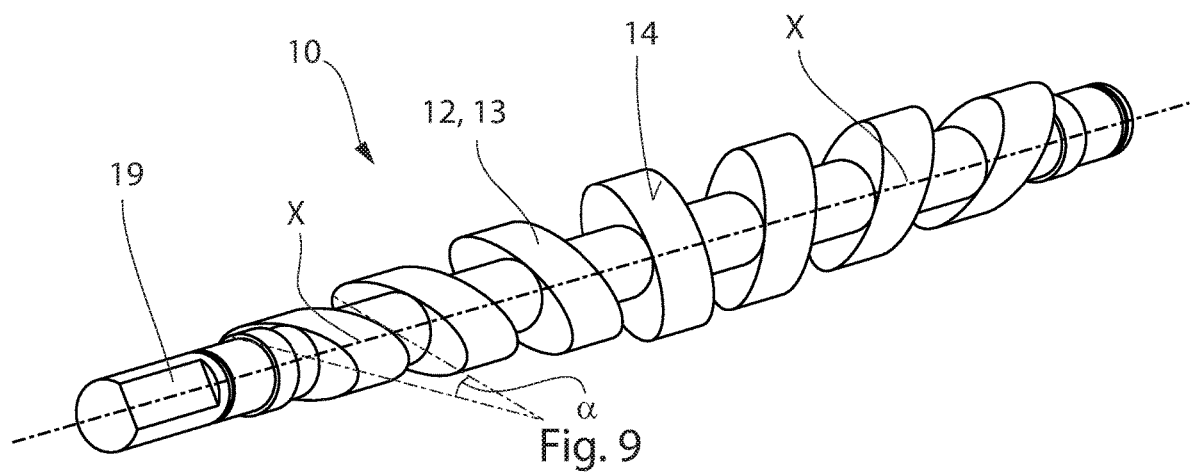
Figure 10:
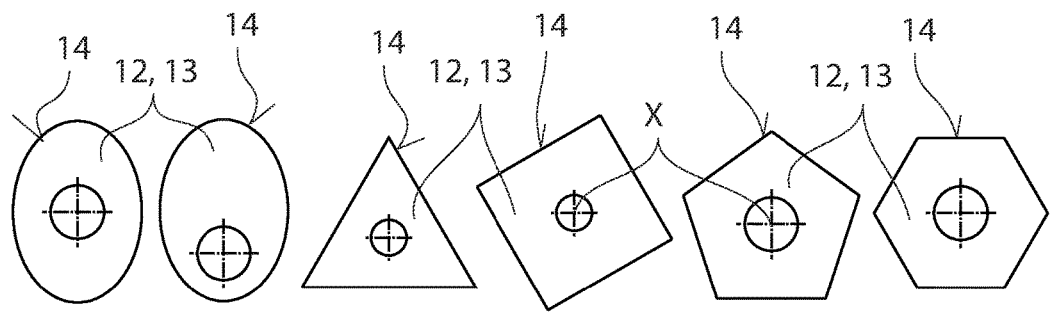
Figure 11:
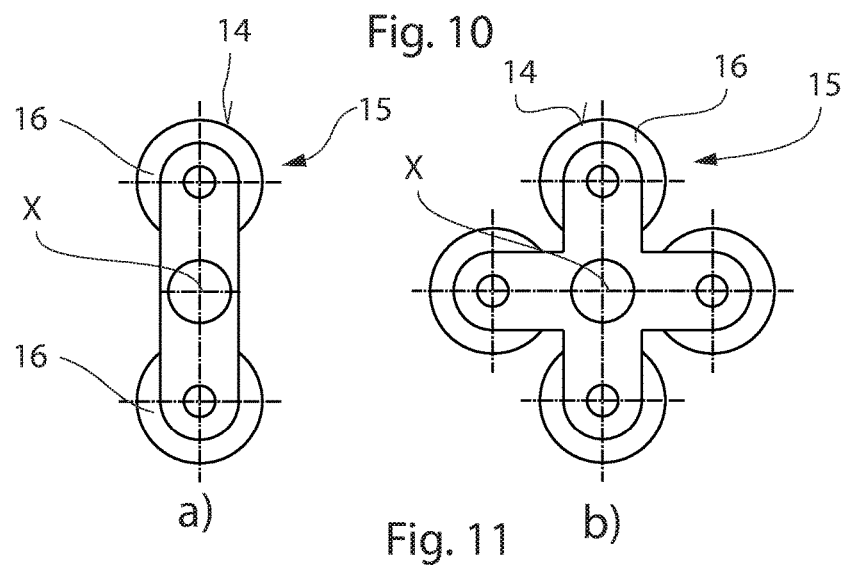
Figure 12:
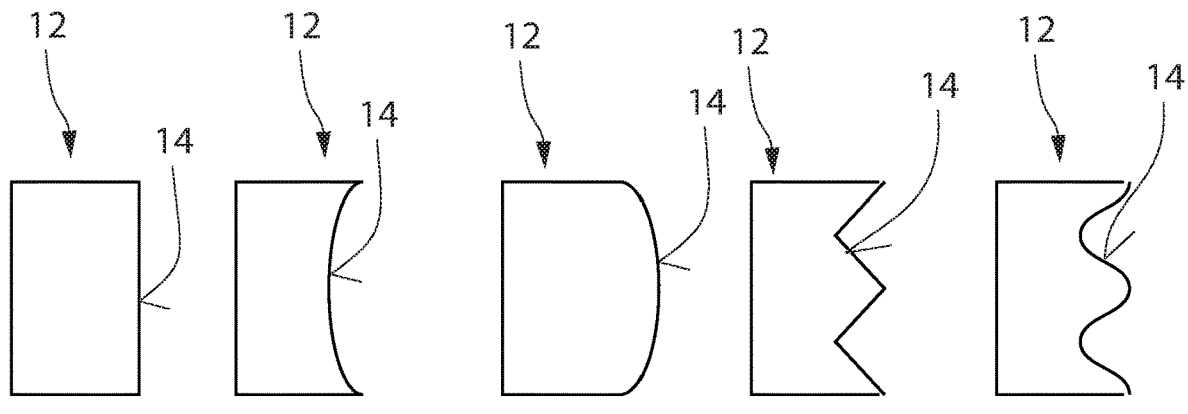
Figure 13:
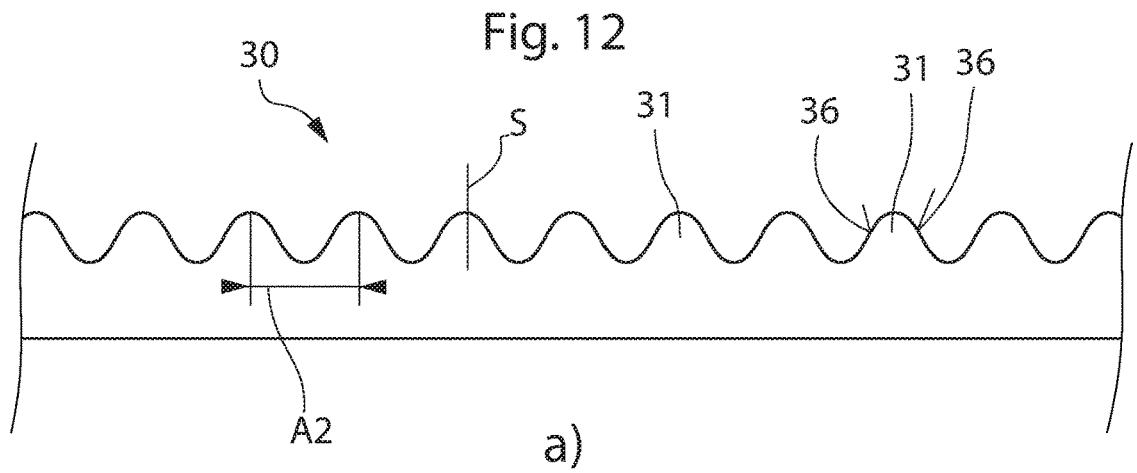
Figure 13:
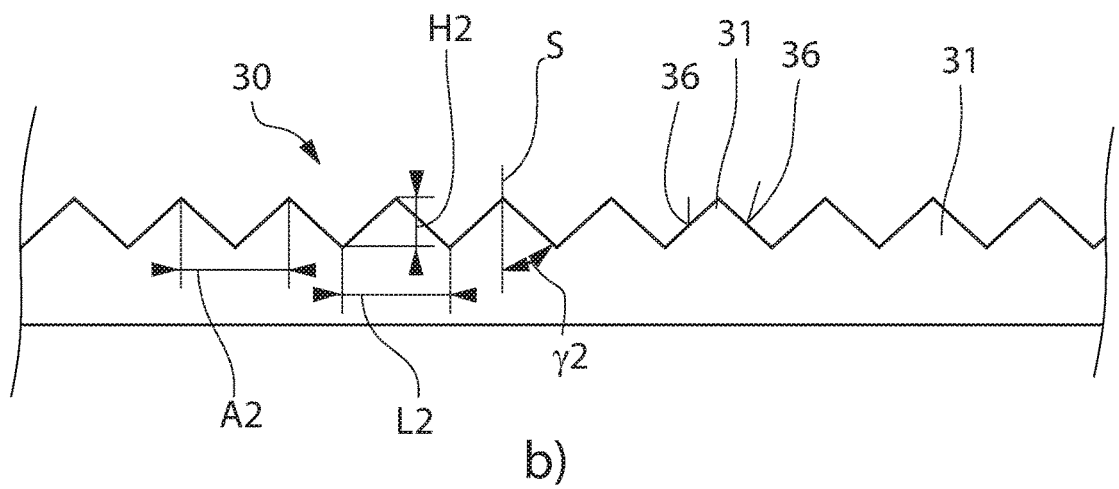
Figure 14:
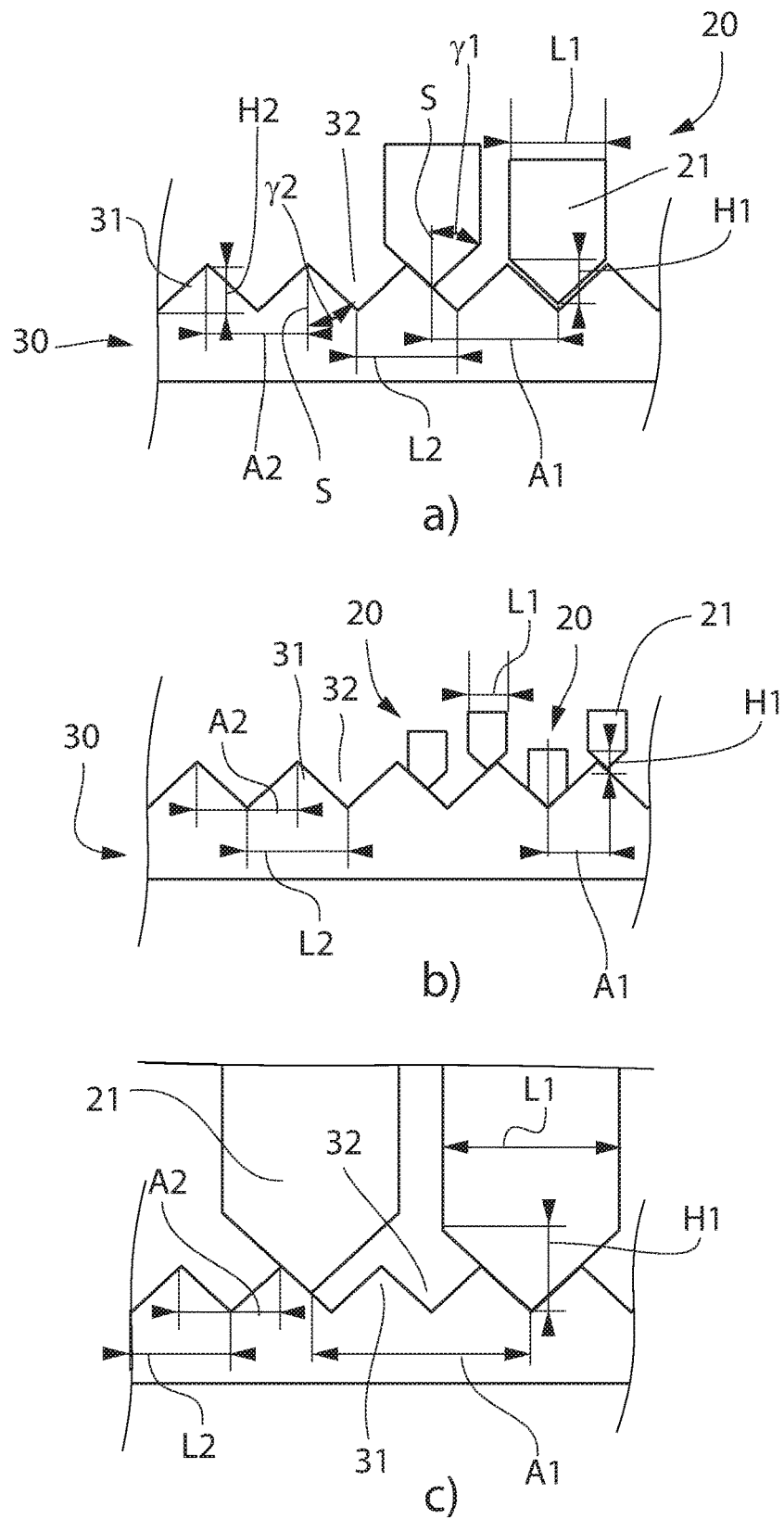
Figure 15:
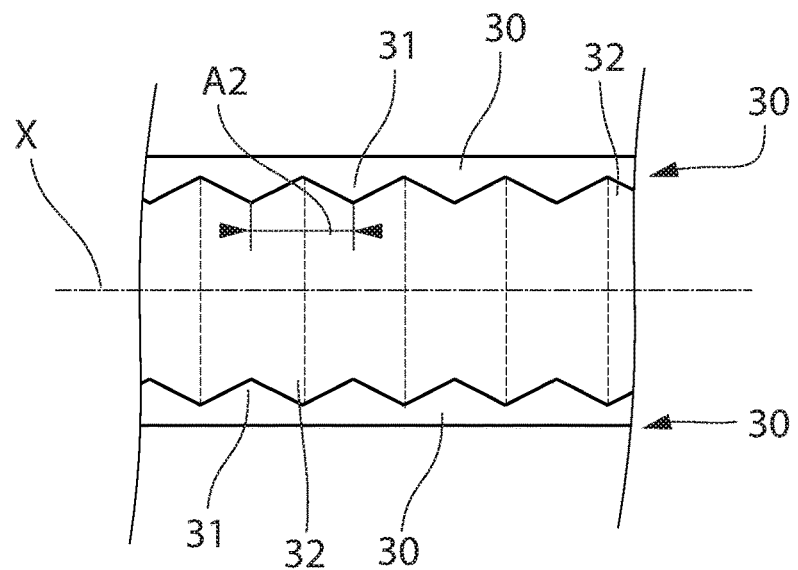
Figure 15:
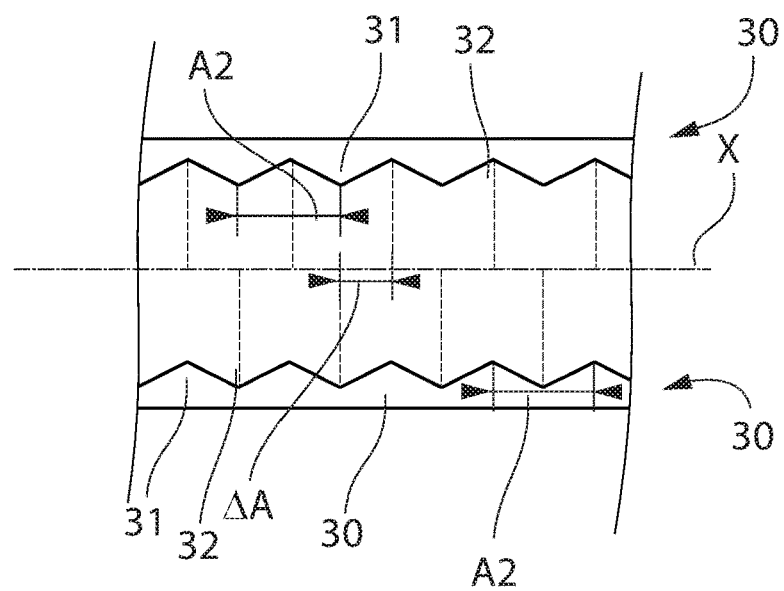

Hereinafter, an exemplary embodiment according to the invention, as well as further embodiments of the present invention are described in detail with reference to the accompanying drawings. Where:

FIG. 1 shows a perspective view of a linear drive according to the invention, comprising a sliding carriage arranged in a gear rack housing with at least two propelling teeth, which teeth are drivingly connected to a drive shaft and, upon rotation of the drive shaft in a cyclical reciprocating movement, dip into at least one gear rack of the gear rack housing to generate propelling motion, FIG. 2 shows a top view of the linear drive according to the invention as shown in FIG. 1, FIG. 3 shows a top view as shown in FIG. 1, wherein the components in the sliding carriage are visible, FIG. 4 shows a perspective and detailed view of the sliding carriage according to FIG. 3, FIG. 5 shows a detailed view of the components of the sliding carriage in the perspective according to FIG. 4, FIG. 6 shows a simplified representation of the drive shaft of the propelling tooth and a gear rack, FIG. 7 shows a simplified representation of the drive shaft of the propelling tooth and a gear rack as shown in FIG. 6, wherein a row with a propelling tooth and a gear rack is arranged on diametrical sides of the drive shaft, FIG. 8 shows a simplified representation of the drive shaft of the propelling tooth and a gear rack according to FIG. 6 or FIG. 7, wherein four propelling teeth are symmetrically arranged circumferentially about the drive shaft in one plane, FIG. 9 shows an enlarged perspective representation of the drive shaft, wherein it is visible that the drive shaft is designed as a camshaft along a longitudinal axis and has a plurality of camshaft cams by means of which the cyclical reciprocating movement of the propelling teeth is specified during rotation of the drive shaft, FIG. 10a-e shows one schematic representations of the cross section of the camshaft cams, FIG. 11a-b shows schematic representations of contact rollers, by means of which rollers the cyclical reciprocating movement of the propelling teeth is specified during one rotation of the drive shaft, FIG. 12a-e shows schematic representations of different embodiments of contact surfaces of the guide means, FIG. 13a-b shows schematic representations of different embodiments of the teeth of the gear rack, FIG. 14a-c shows schematic representations of different size ratios of the teeth of the gear rack and the propelling teeth, and FIG. 15a-b shows schematic representations of different arrangements of the gear racks.

Hereinafter, identical or functionally identical components are identified with the same reference signs. For the sake of clarity, not all identical or functionally identical parts are given a reference number in the individual figures.

FIG. 1 shows a linear drive 1 according to the invention, comprising a gear rack housing 35 and a sliding carriage 40, which is movably mounted along a longitudinal axis X between two gear racks 30. The linear drive 1 can be used in a longitudinal-adjustment unit 2 (not shown) for the adjustment of a seat (not shown) in a motor vehicle 3 (not shown).

The gear rack housing 35 may be cuboidal as in the exemplary embodiment and enclose—at least partially—a space 38. One of the gear racks 30 is respectively arranged on two sides diametrically facing space 38, which gear rack is respectively formed of a plurality of teeth 31, which are preferably arranged equidistantly along the longitudinal axis X. A corresponding interdental space 32 is respectively formed between two teeth 31.

The gear rack housing 35 can be designed in such a way that it forms a stop in the longitudinal axis X in a first end area and in a second end area, by means of which stop the maximum travel path of the sliding carriage 40 within the space 38 is specified.

In the illustrated exemplary embodiment, the teeth 31 of the two gear racks 30 are identical, however the teeth 31 of the gear racks 30 can have different tooth shapes as well as different distances A2.

As shown in FIG. 2, the respective distance A2 is measured in relation to the geometric center of the respective tooth 31. In the case of symmetrical teeth 31, a tooth tip is typically formed in the geometrical center, from which two symmetrical tooth profiles extend as friction surfaces 36. In the illustrated exemplary embodiment, the two profiles enclose an angle of about 135°, wherein the profiles preferably enclose an angle of less than or equal to 180° and greater than 30°.

As shown in FIG. 4, the sliding carriage 40 may include a two-part housing comprising a first housing part 43 and a second housing part 44. The housing has a first end area 41 and a second end area 42 that can cooperate with the gear rack housing 35 to act as an end stop.

FIG. 3 shows that a drive shaft 10 is arranged in the housing of the sliding carriage 40 coaxially to the longitudinal axis X, which is rotatably mounted in the longitudinal axis X by means of bearing 48. The drive shaft 10 may be coupled to a propulsion unit 50 by means of a gearbox 55, whereby the drive shaft 10 may be caused to rotate about the longitudinal axis X by the propulsion unit 50.

The propulsion unit 50 may preferably be an electric propulsion unit and further preferably be coupled to the drive shaft 10 by the gearbox 55 configured as a planetary gearbox. The gearbox 55 may translate a rotational speed of the propulsion unit 50 into a rotational speed of the drive shaft.

The drive shaft 10 includes a plurality of guide means 12 that are spaced apart from each other between the two bearings 48. The guide means 12 are each arranged in a plane orthogonal to the longitudinal axis X and can have an eccentric, cam-shaped, elliptical or polygonal configuration, as will be described in detail below. The drive shaft 10 forms a type of camshaft and the guide means 12 are formed by camshaft cams 13.

As can, in particular, be seen from FIG. 6 and FIG. 9, the guide means 12 are each arranged along the longitudinal axis X rotated at an angle α to one another, whereby in the present embodiment example the guide means 12 which are designed as an ellipse or alternatively the camshaft cams 13 are each arranged rotated about the longitudinal axis X at an angle α=22.5°.

In further reference to FIG. 3, it can be seen that several guide recesses 45 are arranged in the housing, each of which is centrally arranged transversely to the longitudinal axis X and on diametrical sides to the guide means 12 and the camshaft cams 13.

One propelling tooth 20 is dipped into the respective guide recess 45, which tooth is movable in the guide recess 45 and, as indicated by the double arrow, can carry out a reciprocating movement 21, which runs radially or in a secant-manner to the longitudinal axis X.

Two rows of respectively seven propelling teeth 20 each are arranged symmetrically to the longitudinal axis X, about the drive shaft 10. The rows are aligned parallel to the longitudinal axis X. The guide recess 45 forms a bearing for the respective propelling tooth 20, whereby the propelling tooth 20 is smoothly reciprocatingly moveably mounted perpendicularly to the longitudinal axis X and can dip into and out through the guide recess 45 into one of the interdental spaces 32 of the gear rack 30.

In the dipped-out state, the respective propelling tooth 20 can be guided along the longitudinal axis X over a tooth tip of a tooth 31 of the gear rack.

The respective propelling tooth 20 can preferably be adapted to the shape of the teeth 31 of the gear rack 30, whereby the tooth profiles of the propelling tooth 20 lie flat against the profiles of the teeth 31 when the propelling tooth 20 is fully dipped into the interdental space 32. The width of the respective propelling tooth 20 can correspond to the distance A2 between two teeth 31. However, it is essential that a distance A1 between two propelling teeth 20 is greater than or less than the distance A2 between two teeth 31, thus A2<A1 or preferably A1>A2. In other words, A1 must be ≠A2.

The respective propelling tooth 20 further comprises a tooth root 22 having a contact surface 24. The tooth root 22 may have a constant cross-section and corresponding surfaces on which it can slide along the guide recess 45 in a linearly guided manner with minimized friction during the cyclical reciprocating movement.

The drive shaft 10 and the propelling teeth 20 are drivingly connected to each other in such a way that the respective propelling tooth 20 carries out at least one cyclical reciprocating movement 21 during one rotation φ of the drive shaft 10. The cyclical reciprocating movement 21 can be described, for example, as a complete period of a sinus curve, wherein, within one cyclical reciprocating movement 21, the respective propelling tooth 20 once dips into the gear rack 30 or an interdental space 32, and once dips completely out and returns to the initial position. It is, however, also possible in the sense of the present invention that the respective propelling tooth 20 carries out several cyclical reciprocating movements 21 during one rotation φ, as will be explained below.

Due to the guide means 12 being rotated about the longitudinal axis X at an angle α, the cyclical reciprocating movement 21 of the respective propelling teeth 20 occurs in a phase-shifted manner, whereby the propelling teeth 20 dip into and out of the respective gear rack 30 at different angles of rotation of the drive shaft 10. In other words, at a constant rotational speed of the drive shaft 10, the propelling teeth 20 engage an interdental space 32 at different times.

The guide means 12 have a contact surface 14, which forms the outer side facing the propelling tooth 20. The contact surface 14 and the contact surface 24 of the respective propelling tooth 20 slide against each other, whereby a force acting radially or in a secant-manner is applied to the respective propelling tooth 20 by the contact surface 14, by which the propelling tooth 20 is pushed through the guide recess 45 in the direction of the gear rack 30.

The mode of operation of the linear drive 1 is based on the fact that the respective propelling tooth 20 comes into frictional contact with a profile of one of the teeth 31 of the gear rack 30 when it is dipped into an interdental space 32 of the gear rack 30. When the respective propelling tooth 20 is dipped in, a first profile or one of the friction surfaces 26 comes into contact with the profile or the friction surface 36 of one of the teeth 31. Due to the wedge-shaped design, the two friction surfaces 26, 36 generate a propelling motion directed in the longitudinal axis X, by means of which the sliding carriage 40 is displaced along the longitudinal axis X into the space. As soon as one of the propelling teeth 20 is fully dipped into the gear rack 30, another propelling tooth 20, which is arranged offset to the center of another interdental space 32, follows in a phase-shifted manner. The further propelling tooth 20 dips into a further interdental space 32 while generating a propelling motion. Meanwhile, the propelling tooth 20 that was first fully dipped into the interdental space 32 emerges from the interdental space 32 either through spring-loading or because of the contacting friction surfaces 26, 36. Additional propelling teeth 20 may follow in a staggered or simultaneous manner, allowing further propelling motion to be generated.

In the present embodiment example, according to FIGS. 1-5, the guide means 12 are elliptical, whereby the respective propelling tooth 20 undergoes two complete cycles or periods during one rotation φ. Consequently, the respective propelling tooth 20 dips into and out of the gear rack 30 twice during one rotation φ of the drive shaft 10. Due to the angular offset of 22.5° between two guide means 12 spaced along the longitudinal axis X, the phase shift Δφ related to one rotation φ of the longitudinal axis X is ¹⁄₃₂φ. In other words, the drive shaft 10 must be rotated by 11.25° so that following the dipping into of one first propelling tooth 20, a second propelling tooth 20 dips into a further interdental space 32.

The linear drive 1 has at least two propelling teeth 20, which may be arranged in a single row parallel to the longitudinal axis X, as shown in FIG. 6.

As already explained in connection with FIGS. 1-5, the propelling teeth 20 may, however, be arranged in two rows spaced apart as shown in FIG. 7, wherein the respective rows of propelling teeth 20 is each associated with one gear rack 30. The two rows may be arranged as desired about the longitudinal axis X, but a circumferentially symmetrical arrangement is preferred.

FIG. 8 shows a further development of the linear drive 1, in which four propelling teeth 20 are arranged orthogonally or transversely to the longitudinal axis X in a plane, which can respectively dip into and out of a gear rack 30.

FIGS. 10a-10e show different cross-sections of the guide means 12, wherein the guide means 12 have in common that the course of the radius measured in relation to the longitudinal axis X over the circumference has at least one local minimum and one local maximum. The elliptical cross-section according to FIG. 10a has two maximums and two minimums, whereby the propelling teeth in active contact with the guide means 12 configured in this way carry out two cyclical reciprocating movements 21 during one rotation φ of the drive shaft 10, whereas the eccentric cross-section according to FIG. 10b leads to only one cyclical reciprocating movement 21 during one rotation φ of the drive shaft 10. The polygonal cross-sections according to FIGS. 10c-10e have several edges, whereby the number of edges determines the number of cyclical reciprocating movements 21 during one rotation of the drive shaft 10.

As an alternative to a camshaft with camshaft cams 13, the drive shaft 10 can have rolling contacts 15, which are formed by contact rollers 16 arranged radially to the longitudinal axis X. The respective contact roller 16 forms the contact surface 14, which in contrast to the cam discs, however, rolls on the contact surface 24 of the respective propelling tooth 20. The rolling contacts 15 can be designed as a double rolling contact 15 as shown in FIG. 11a, or as a multiple rolling contact 15, for example as a quadruple rolling contact 15 as shown in FIG. 11b, wherein the number of contact rollers 16 can be selected as desired.

FIGS. 12a-e show different designs of the contact surfaces 14 of the guide means 12, wherein the contact surfaces according to FIGS. 12b-e can have a concave, a convex, a zigzag or a sinusoidal design, whereby a partial positive form-fit can be achieved between the respective propelling tooth 20 and the guide means 12, by means of which an axial force in the longitudinal axis X can be transmitted from the propelling tooth 20 to the drive shaft 10.

Also, both the teeth 31 of the gear rack 30 and the propelling teeth 20 (not shown) can have different tooth geometries. By way of example, in FIG. 13a the teeth 31 are sinusoidal and in FIG. 13b they are zigzag shaped with two profiles which are symmetrical about a line of symmetry S. It is also possible that either the teeth 31 or the propelling teeth 20 may be rectangular, wherein at least the teeth 31 of the gear rack 30 or the propelling teeth 20 have a friction surface 26, 36 that is wedge-shaped to generate a propelling motion.

As soon as a propelling tooth 20 dips into an interdental space 32, a positive form-fit is achieved between the gear rack 30 and the sliding carriage 40, whereby the sliding carriage 50 is mounted in the longitudinal axis X with virtually no play. The propelling teeth 20 thus wedge the sliding carriage 50 in the longitudinal axis X, and the propelling teeth 20 in engagement with the gear rack 30 determine the breaking load, which can be configured as desired both by the number of propelling teeth 20 in a row and by the number of rows.

FIGS. 14a to 14c show different size ratios of propelling teeth 20 and teeth 31 of gear rack 30. The respective propelling tooth 20 has a tooth length L1, a tooth height H1 and a tooth profile angle γ1. Likewise, the teeth 31 of the gear rack 30 have a tooth length L2, a tooth height H2, and a tooth profile angle γ2, wherein, typically, the tooth profile angles γ1, γ2 can be chosen to be equal so that a surface contact can be formed between the tooth profiles of the propelling teeth 20 and the gear rack 30. It should be noted, however, that at least one of the tooth profiles can also have a curved shape.

FIG. 14a schematically shows exemplary size relationships between the propelling tooth 20 and the teeth 31 of the gear rack 30 according to FIGS. 1-3. In this, it can be seen that the distance A1 between the propelling teeth 20 is greater than the distance A2 of the teeth 31 of the gear rack 30 and the tooth heights H1, H2 and the tooth lengths L1, L2 are virtually equal.

An increase in the size of the teeth 31 of the gear rack 30 in relation to the advancing teeth 20 can be seen in FIG. 14b, and it can also be seen from this figure that a plurality of advancing teeth 20 can dip into an interdental space 32 between two teeth 31. By increasing the size of the teeth 31 of the gear rack 30, the contact area of the advancing teeth 20 on the tooth profiles 36 of the teeth 31 is increased, which allows a smoother transmission of force.

A greater overlap between the propelling teeth 20 and the tooth profiles 36 of the teeth 31 of the gear rack 30 can be achieved by increasing the tooth length L1, or by increasing the tooth height H1, according to which: A1>A2, L1>L2 and H1>H2. By a greater overlap between the propelling teeth 20 and the tooth profiles 36, a higher maximum load can be achieved, and the smooth running of the drive device 1 can be increased.

FIG. 15a shows an arrangement of the gear rack 30 on two opposite sides of the longitudinal axis X according to FIGS. 1-3, wherein it can be seen that the teeth 31 and the interdental spaces 32 are arranged symmetrically (mirrored on the longitudinal axis X). According to a further development shown in FIG. 15b, the gear rack 30 can, however, be arranged asymmetrically shifted by an offset ΔA, wherein in the illustrated embodiment example the offset ΔA is one half of distance A2.

REFERENCES LIST

1 Drive device
2 Longitudinal-adjustment unit
3 Motor vehicle
10 Drive shaft
12 Guide means
13 Camshaft cam
14 Contact surface
15 Rolling contact
16 Contact roller
19 Coupling
20 Propelling tooth
21 Reciprocating movement
22 Tooth root
24 Contact surface
26 Friction surface
30 Gear rack
31 Tooth
32 Interdental space
35 Gear rack housing
36 Friction surface
38 Space
40 Sliding carriage
41 First end area
42 Second end area
43 Housing part
44 Housing part
45 Guide recess for 20
48 Bearing
50 Propulsion unit
55 Gearbox
A1 Distance between two propelling teeth 20
A2 Distance between two teeth 31
ΔA Offset
H1 Height of 21
H2 Height of 31
L1 Length of 21

L2 Length of 31
S Line of symmetry
X Longitudinal axis
α Angle of 13
γ1 Tooth profile angle of 21
γ2 Tooth profile angle of 31
φ Rotation
Δφ Phase shift

The invention claimed is:

1. A linear drive (1), comprising:
a drive shaft (10) arranged along a longitudinal axis (X);
at least two propelling teeth (20); and
at least one gear rack (30) having a plurality of teeth (31),
wherein the at least two propelling teeth (20) are reciprocatingly movable perpendicularly to the longitudinal axis (X) and are drivingly connected to the drive shaft (10) in such a way that the at least two propelling teeth (20) carry out at least one cyclical reciprocating movement (21) during the course of one rotation (φ) of the drive shaft (10) and dip into and out of the at least one gear rack (30) for generating a propelling motion in the longitudinal axis (X),
wherein a respective one of the propelling teeth (20) has a greater, equal or smaller tooth length (L1) and/or a greater tooth height (H1) than a corresponding one of the teeth (31) of the gear rack (30), and
wherein the cyclical reciprocating movement (21) of the at least two propelling teeth (20) is carried out with a phase shift (Δφ).

2. The linear drive (1) according to claim 1, characterized in that
the at least two propelling teeth (20) are arranged at a first distance (A1) along the longitudinal axis (X), and that the teeth (31) are arranged at a second distance (A2) along the longitudinal axis (X), wherein the following applies:
A1<A2 or A1>A2.

3. The linear drive (1) according to claim 1, characterized in that
the respective one of the propelling teeth (20) and/or the corresponding one of the teeth (31) of the gear rack (30) are rectangular, wedge-shaped, involute-shaped or sinusoidal.

4. The linear drive (1) according to claim 1, characterized in that
the respective one of the propelling teeth (20) and/or the corresponding one of the teeth (31) are or is symmetrical.

5. The linear drive (1) according to claim 1, characterized in that
the respective one of the propelling teeth (20) and the corresponding one of the teeth (31) have the same tooth profile angle (α1, α2).

6. The linear drive (1) according to claim 1, characterized in that
the at least two propelling teeth (20) and the plurality of teeth (31) have a corresponding geometry.

7. The linear drive (1) according to claim 1, characterized in that
for the phase shift (Δφ) of the cyclical reciprocating movement (21) of the at least two propelling teeth (20) with respect to one rotation (φ) of the drive shaft (10) the following applies: $\frac{1}{256}\varphi \leq \varphi \leq \frac{1}{2}\varphi$.

8. The linear drive (1) according to claim 1, characterized in that
the drive shaft (10) comprises a crankshaft or a camshaft and has at least one guide means (12) which specifies the cyclical reciprocating movement (21) during the rotation (φ) of the drive shaft (10).

9. The linear drive (1) according to claim 8, characterized in that
the at least one guide means (12) has a contact surface (14), and in that the contact surface has a planar, concave, convex or sinusoidal course in the longitudinal axis.

10. The linear drive (1) according to claim 8, characterized in that
the at least one guide means (12) comprises a camshaft cam (13) which is formed in cross-section as an eccentric, ellipse, polygon, tetragon, pentagon or hexagon.

11. The linear drive (1) according to claim 1, characterized in that
the respective one of the propelling teeth (20) is spring-loaded against the drive shaft (10) and/or is drivingly connected to the drive shaft (10) by means of a connecting rod.

12. The linear drive (1) according to claim 1, characterized in that
the respective one of the propelling teeth (20) is drivingly connected to the drive shaft (10) by means of a sliding contact or one single or a plurality of rolling contact(s) (15).

13. The linear drive (1) according to claim 1, characterized in that
the at least two propelling teeth (20) are arranged in a row along an axis parallel to the longitudinal axis (X).

14. The linear drive (1) according to claim 13, characterized in that
at least two rows of the propelling teeth and at least two of the gear racks (30) are arranged about the longitudinal axis (X).

15. The linear drive (1) according to claim 14, characterized in that
the at least two rows and the at least two gear racks are arranged circumferentially symmetrically about the longitudinal axis (X).

16. The linear drive (1) according to claim 14, characterized in that
the at least two gear racks (30) are arranged shifted from one another by an offset (AA).

17. The linear drive (1) according to claim 1, characterized in that
a sliding carriage (40) is provided, and in that the drive shaft (10) and the at least two propelling teeth are mounted in the sliding carriage.

18. The linear drive (1) according to claim 1, characterized in that
a propulsion unit (50) is provided, wherein the propulsion unit (50) drives the drive shaft (10).

19. The linear drive (1) according to claim 18, characterized in that
a gearbox (55) is arranged between the propulsion unit (50) and the drive shaft (10).

20. A longitudinal-adjustment unit (2) comprising a linear drive (1) according to claim 1.

21. A motor vehicle (3) comprising a linear drive (1) according to claim 1.

22. The linear drive (1) according to claim 19, wherein the gearbox (55) comprises a planetary gearbox.

* * * * *

UNITED STATES PATENT AND TRADEMARK OFFICE
CERTIFICATE OF CORRECTION

| | |
|---|---|
| PATENT NO. | : 11,865,951 B2 |
| APPLICATION NO. | : 17/616093 |
| DATED | : January 9, 2024 |
| INVENTOR(S) | : Marco Werschler and Marcel Mittelbach |

It is certified that error appears in the above-identified patent and that said Letters Patent is hereby corrected as shown below:

In the Claims

Claim 16, Column 12, Line 45, delete "(AA)" and replace with "($\Delta$A)".

Signed and Sealed this
Fifth Day of March, 2024

Katherine Kelly Vidal
*Director of the United States Patent and Trademark Office*